Patented Apr. 18, 1944

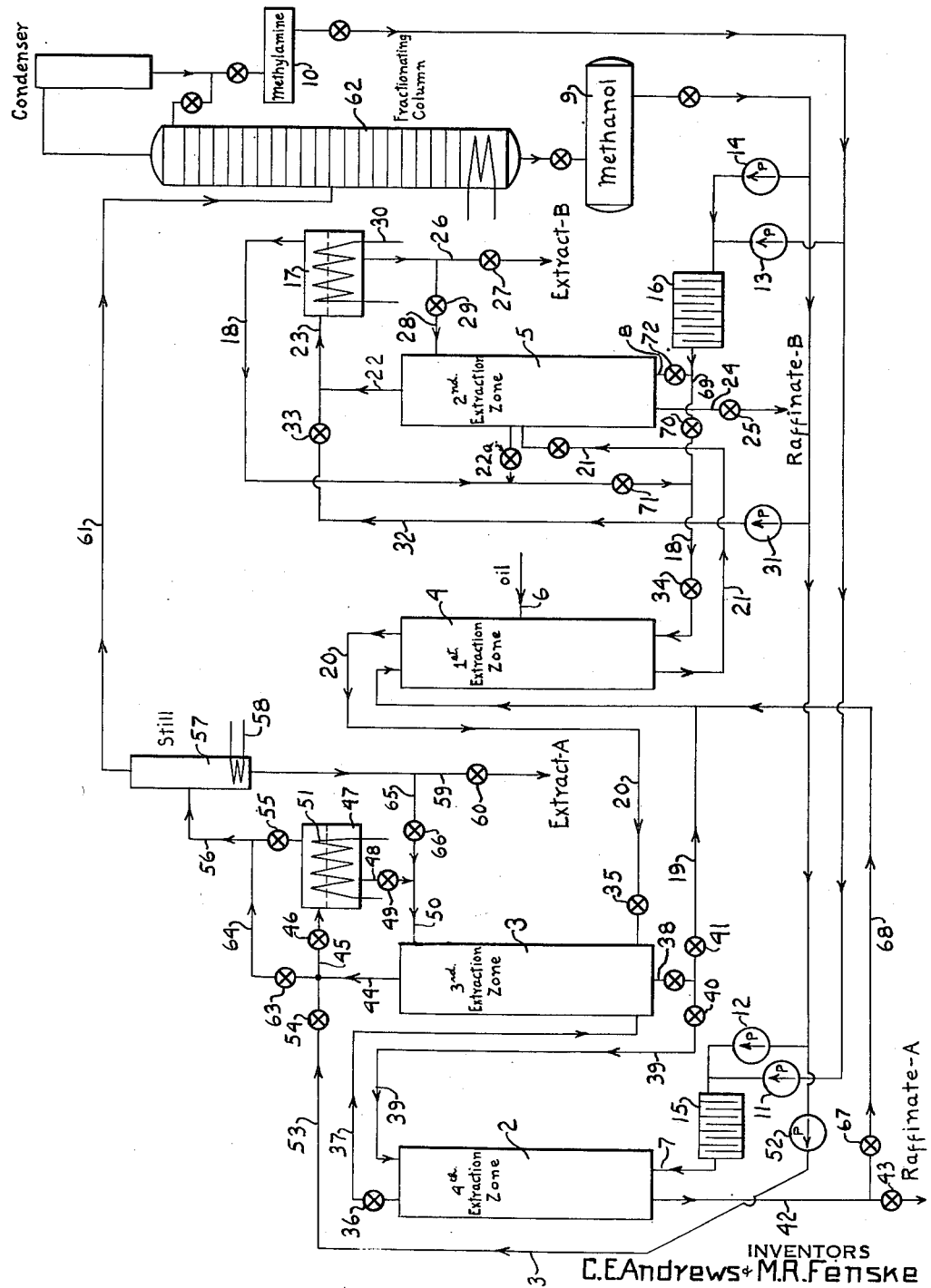

2,346,639

UNITED STATES PATENT OFFICE 2,346,639

PROCESS OF SEPARATING HYDROCARBON MIXTURES

Chester E. Andrews, Overbrook, and Merrell R. Fenske, State College, Pa., assignors to Röhm & Haas Company, Philadelphia, Pa.

Application April 19, 1940, Serial No. 330,478

15 Claims. (Cl. 196—13)

This invention relates to a process of separating mixtures of hydrocarbons, such as petroleum fractions, into fractions of different molecular type and different molecular size. More particularly it relates to a process of extracting such hydrocarbon mixtures by a countercurrent process so as to produce more than two fractions, the dissolving capacity of the solvent being changed at certain stages of the process to cause the separation of the desired products.

This application is a continuation-in-part of our copending application Serial No. 155,432 filed July 24, 1937, now U. S. Patent No. 2,220,619, which in turn is a continuation-in-part of our Patent No. 2,096,725 granted October 26, 1937.

Petroleum and the various fractions that are commonly obtained from it consist essentially of hydrocarbons of different molecular type and different molecular weight. The different types of hydrocarbons present in such mixtures may be classified generally into three classes. There are the more highly polar types such as aromatics, diolefins and olefins, the cycloaliphatics or naphthenes, and the aliphatics or paraffins. Most petroleum oils and their ordinary fractions contain two of these types and many of them contain all three. There may also be present compounds containing groups belonging to any two or all three of these classes but such compounds can generally be classified in accordance with the properties of the predominating group. Within each of these groups there are compounds of different molecular weights which have different solubilities in the solvents employed in the present invention. Generally speaking, the compounds of low molecular weight in any group are more soluble than those of high molecular weight. For a given molecular weight the aromatic and unsaturated compounds are in general the most soluble and the paraffinic compounds the least soluble in any given solvent, the naphthenic compounds having an intermediate solubility.

The present invention is based on these varying solubility characteristics and on the fact that the dissolving capacity of the solvents employed can be varied at will over a wide range so that they are adaptable to practically any condition it is desired to impose on the extraction process. These conditions comprise solvent to oil ratio, temperature, temperature gradient, and the type of extraction apparatus, i. e. whether it is a countercurrent tower or a series of mixers and settlers.

It is necessary to be able to change the dissolving capacity of the solvent through wide limits, in order that materials may be separated that heretofore were not separable, or to permit them to be obtained in degrees of purity not heretofore realizable. In general, for solvents to operate selectively and also be practical, the concentration of dissolved components in the solvent should lie between 5 and 30 percent, and it follows, if countercurrent contacting is to occur, that a hydrocarbon phase must be present along with the solvent phase, and must not be completely soluble in the solvent phase. Thus, if a certain component is to be made relatively pure by solvent extraction, it must itself be incompletely soluble in the solvent. If the desired component is the most soluble one in the mixture from which it is to be separated, there are additional solubility factors to be considered, for unless this component in the purity desired is incompletely miscible in the solvent, it cannot be prepared in this degree of purity. For example, toluene is completely miscible in pure sulfur dioxide or monomethylamine at temperatures down to —100° F. or below, whereas other hydrocarbons with which it may be normally associated and from which separation is desired, such as n-octane, are only completely miscible at much higher temperatures. For example, sulfur dioxide is incompletely miscible with n-octane at room temperature. With monomethylamine temperatures below —50° F. are needed to produce 2 phases with n-octane. This means that if sulfur dioxide were the solvent, n-octane could be obtained technically pure at ordinary temperatures, whereas temperatures below —100° F. would be needed for preparing technically-pure toluene by extraction with sulfur dioxide. With monomethylamine the required temperatures for toluene separation would be below —100° F. and for n-octane at about —50° F. Instead of these markedly different temperatures being required, the solvent power of the solvent may be changed by another solvent or modifying solvent such as listed below. For example, adding about 30 percent water is sufficient to make monomethylamine incompletely miscible with toluene at room temperature. It is a relatively simple and straightforward procedure to determine the approximate miscibility temperatures of various hydrocarbons and solvent combinations. It suffices to note that in dealing with hydrocarbons, the ranges in solubility encountered are apt to be very wide. Accordingly, this invention is concerned with adjusting the solvent capacity of solvents to enable additional separations or products to be made in any desired degree of purity.

The solvents employed usually contain two ingredients, one of which is a better solvent for the hydrocarbons than the other so that the dissolving capacity of the mixture can be varied by changing the ratio of the ingredients. The dissolving capacity of the mixed solvent can also be changed by varying the temperature. Examples of the primary and modifying solvents are given below—

| Primary solvent | Modifying solvent |
|---|---|
| Methylamines | Water, alcohol, ammonia |
| Acetone | Water, methanol |
| Acetonitrile | Do. |
| Dichloroethyl ether | Glycols or their ethers |
| Furfural | Water |
| Glycols or their ethers | Do. |
| Methyl formate | Do. |
| Phenol | Do. |
| Pyridine | Do. |
| Sulfur dioxide | Carbon dioxide |

The process will be illustrated by means of the methylamine solvent using methanol as the modifying solvent but it is understood that other combinations of primary and modifying solvents may be used. The three methylamines have different dissolving capacity for hydrocarbons. Trimethylamine is the strongest solvent for nearly all hydrocarbons, dimethylamine next, and monomethylamine the weakest. Therefore by employing various mixtures of two or all three of the methylamines, the dissolving capacity of the solvent can be varied over a rather wide range. This range may be extended in the direction of lower dissolving capacity by mixing with the methylamine a liquid, miscible therewith, which has a lower capacity for dissolving hydrocarbons. The methylamines may then be considered a primary solvent in which various amounts of a modifying solvent are dissolved. These modifying solvents are chemically inert toward the methylamines, are soluble in them, and possess a lower dissolving capacity for a particular hydrocarbon type than the methylamines. In the case of the methylamines these modifying solvents are one or more of the following substances: methanol and the low molecular weight alcohols, the lower aliphatic cyanides, water, ammonia, ethers, and etheralcohols such as polyglycols and the monoalkylethers of polyglycols. Of these the lower alcohols such as methanol and ethanol are particularly useful in the present invention. Methanol is a suitable liquid because of its low solvent power, ease of separation from the oils, low viscosity of its mixtures with the methylamines and ease of separation from the methylamines and recombination therewith to form any desired solvent mixture. Thus, in extracting a heavy petroleum oil, for example, the first solvent used would contain a larger proportion of methanol than the second one which in turn would contain more methanol than the third solvent. Because of the marked similarity, both physically and chemically, of ammonia and methylamines, ammonia in any suitable or effective concentration may be included in the methylamines. Ammonia is particularly effective where trimethylamine in considerable proportions is being used since this combination permits a very wide range in solubility characteristics to be attained. This range of solubility characteristics may exceed that of any other methylamine or methylamine mixture since there are marked differences in the solubility of hydrocarbons in ammonia on one hand, and trimethylamine on the other. However, it is to be understood that ammonia may be used with any one of the methylamines or any mixture of them. As an illustration of the solubility characteristics of ammonia, it is found that whereas a typical dewaxed "180 Pennsylvania neutral oil" is completely soluble in pure trimethylamine and pure dimethylamine and almost, if not entirely, soluble in monomethylamine at temperatures of the order of 80° F., ammonia with the same oil at about this temperature only dissolves about 10% of the oil when about six parts of ammonia to one part of oil by weight are mixed.

The ratio of solvent to oil may also vary widely and will depend on the nature of the oil, the proportion of the various constituents thereof, and the size of the fraction to be separated. The ratio may vary between one and ten volumes of solvent per volume of oil being treated. For most practical operations, however, the ratio will be between two and four volumes of solvent per volume of oil. When successive extractions are carried out on the oil by solvents of graduated dissolving capacity, the ratio of solvent to oil may or may not be the same in each step, the actual ratio chosen being determined by various factors such as type of material being extracted, the proportion thereof in the oil and the specific solvent capacity of the solvent.

The primary object of the present invention is to provide a continuous process for extracting mixtures of hydrocarbons such as are found in petroleum by means of a primary solvent and a modifying solvent wherein the dissolving capacity of the solvent system may be varied through relatively wide limits, such as would result by using methylamine solvents of varying dissolving capacity. It is a further object to provide a process in which the oil to be extracted enters a suitable extraction system at an intermediate point and is then brought in contact with streams of solvent entering at other points of the system and in this manner to separate continuously the original oil into fractions, for example two raffinates and two extracts. This is accomplished by treating the incoming oil in an intermediate tower with a solvent mixture capable of separating it into two fractions, a raffinate phase and an extract phase, conducting the raffinate phase to another tower where it meets a stream of fresh solvent of greater dissolving capacity than the one with which the original oil was treated so that at least a part of this raffinate phase is further separated into two fractions, and simultaneously conducting the original extract phase to another tower where it meets a stream of solvent having a lower dissolving capacity than the solvent used to extract the original oil. This treatment of the extract from the original oil separates it into two fractions, the most easily soluble constituents of the oil being present in the extract from this second treatment. The solvent with which the original oil is brought in contact has already been used in the other extraction steps of the process so that is usually contains some oil. By thus using the solvent a scrubbing or refluxing effect is obtained which tends to give a fairly sharp fractionation. In this description and claims the words "tower" and "zone" are used to denote any phase-contacting device or path.

The process can be most easily explained by reference to the accompanying drawing which is a diagrammatic sketch of an apparatus suitable for separating a petroleum oil into two fractions by means of methylamine solvents. In the process as illustrated methanol is used as the modifying solvent but other liquids which are essentially non-solvents, or at most only weak solvents, for the hydrocarbons may be used in its place.

The apparatus consists essentially of four extraction towers 2, 3, 4, and 5. The oil to be treated enters tower 4 at inlet 6 and the solvent mixtures enter columns 2 and 5 at inlets 7 and 8 respectively. The solvent mixtures are prepared by pumping methanol and methylamine from storage tanks 9 and 10 by means of metering pumps 11, 12, 13, and 14 through the mixers 15 and 16. The oil entering tower 4 meets a stream of solvent containing some extract coming from tower 5 through separator 17 and line 18. It also meets a stream of raffinate coming from the bottom of tower 3 through line 19 and containing some solvent of composition somewhat different from that coming from column 5. The solvent along with the material extracted from the oil in tower 4 passes through line 20 to a point near the bottom of tower 3. The raffinate from tower 4 passes through line 21 to tower 5, entering at an intermediate point in its height. In this tower the raffinate from tower 4 is brought in contact with the strong, fresh solvent which extracts the soluble material and passes through lines 22 and 23 to the separator 17. The insoluble material or raffinate is withdrawn from the bottom of tower 5 through line 24 and valve 25 and is freed of solvent by any desired means. Part or all of the extract is separated from the solvent in separator 17 and may either be withdrawn through line 26 and valve 27 or part of it may be passed back to the top of tower 5 through line 28 and valve 29 to act as a scrubbing liquid or reflux.

The extracted material may be partly or wholly precipitated in the separator 17 by cooling the solution by means of the cooling coil 30 or by adding methanol. This may be added in measured amounts through metering pump 31 and line 32 equipped with valve 33. The solvent then passes to the bottom of tower 4 through line 18 and valve 34.

The extract phase obtained in tower 4 passes through line 20 and valve 35 to the bottom of tower 3. Here it is mixed with the extract phase from tower 2 which is conducted thence through valve 36 and line 37. When these two solutions mix, the composition of the solvent is changed and part of the material extracted in columns 2 and 4 may precipitate. Any precipitate formed, along with the oil phase present at or near the bottom of tower 3, is removed from the tower through line 38 and may then be conducted either to the top of tower 2 through line 39 and valve 40 or to the top of tower 4 through line 19 and valve 41. Alternatively, the oil phase may be divided and part sent to tower 2 and part to tower 4.

The material entering tower 2 through line 39 meets a stream of relatively weak, fresh solvent which enters at inlet 7. This extracts part of the material. The undissolved portion leaves the tower through line 42 and valve 43 as one of the two final raffinates obtained. The extract passes through line 37 to a point near the bottom of tower 3.

The material remaining in solution in tower 3 passes out through lines 44 and 45 and valve 46 to the separator 47. In this separator part of the dissolved material is precipitated and returned through line 48, valve 49, and line 50 to the top of the tower. The precipitation may be brought about by means of cooling coil 51 or by adding a measured amount of methanol through metering pump 52, line 53 and valve 54. The solution remaining in the separator passes through valve 55 and line 56 to a still 57. This still has a heating coil 58 which removes the solvent from the extract. The latter is withdrawn through line 59 and valve 60. The vapors of the mixed solvent pass from the still through line 61 to the middle of fractionating column 62 where the methylamine and the methanol are separated, the former being collected in storage tank 10 and the latter in tank 9.

Instead of passing the extract from tower 3 through the separator 47 it may be passed directly to the still through valve 63 and line 64 by suitably opening or closing valves 54, 46, 63, 55. In this case part of the extract may be returned to the top of tower 3 through lines 65 and 50 and valve 66 as a refluxing liquid.

In this manner the original oil is separated into four fractions designated on the drawing as raffinate A, raffinate B, extract A, and extract B.

There are other methods for operating the process. For example, part of raffinate A may be returned to tower 4 by means of valve 67 and lines 68 and 19. Also it is not necessary that four products always be made. For instance, all of extract B could be returned to tower 5 through valve 29 and line 28, or tower 5 could be eliminated, and the oil phase leaving the base of tower 4 through line 21 could constitute raffinate B. In this case, the fresh solvent leaving the mixer 16 would be fed into tower 4 through line 69 and valve 70, valves 71 and 72 being closed.

In a similar manner, if it is not desired to make raffinate A, then the three products would consist of extract A, extract B, and raffinate B. In this case tower 2 would not be operated and valves 36, 40, 43, and 67 would be closed, the net result being the same as having tower 3 set directly on top of tower 4.

It is also important to note that towers 4, and 5 each may be considered to consist of two extraction zones, namely: 4—A and 4—B comprising extraction zones above and below, respectively, the oil inlet 6 in tower 4, while extraction zones 5—A and 5—B likewise comprise the portions of tower 5 existing above and below, respectively, the oil inlet line 21 in tower 5. In general, an extraction zone may be defined as any countercurrent phase contacting section containing one or more theoretical extraction stages existing between the points where opposite phases enter the section. Furthermore, an extraction path is defined as one or more extraction zones connected serially. The oil phase to be extracted may enter at an intermediate point or at one end of the extraction path.

In tower 5 all of the ascending solvent need not necessarily flow out through line 22. Part of it may be withdrawn at an intermediate point in tower 5 and led directly to some point below inlet line 6 in tower 4. For example, line 22—a may be used for this purpose.

In the foregoing description the main solvent flow path may be considered to be as follows: entering at 8, passing through tower 5 and out through line 22—a, thence through line 18 and extraction tower 4, next through line 20 and tower 3, and finally out through line 44.

The following examples show the extraction of a dewaxed Pennsylvania cylinder stock. The original oil had a viscosity of 159 Saybolt seconds at 210° F. and a viscosity index of 99. The solvent entering the system at 8 consisted of 95% monomethylamine and 5% methanol, that entering at 7 consisted of 85% monomethylamine and 15% methanol. In the separator 17 sufficient methanol was added so that the solvent consisted of 90% monomethylamine and 10% methanol.

In tower 4 the oil was separated into an extract amounting to 12% of the oil and a raffinate amounting to 88%. The extract had a viscosity of 162 seconds at 210° F. and a viscosity index of −2. The raffinate had a viscosity of 167 seconds at 210° F. and a viscosity index of 103. This raffinate was then separated into two fractions in column 5. The extract B, amounting to 35% of the original oil, had a viscosity of 89 seconds at 210° F. and a viscosity index of 90 whereas the raffinate B, 53% of the oil, had a viscosity of 252 seconds at 210° F. and a viscosity index of 105.

The extract from column 4 was then further separated in columns 2 and 3 into extract A, amounting to 5% of the original oil, having a viscosity of 210 seconds at 210° F. and a viscosity index of −60, and raffinate A, amounting to 7% of the oil and having a viscosity of 135 seconds at 210 F. and a viscosity index of 25.

In the foregoing example the extract A probably contains most of the aromatic compounds and the raffinate A most of the naphthenic compounds originally present in the oil. Raffinate B is nearly all paraffinic and extract B is probably a mixture predominantly paraffinic but containing some naphthenic compounds. This distribution is indicated by the viscosity index of the various fractions.

In carrying out the process the entire system is kept under pressure which is determined principally by the temperature at which the extractions are performed. This pressure is usually great enough to condense the methylamines at ordinary temperatures so that no refrigeration or extra cold cooling water is required in the condenser.

The temperature of the extraction steps may be varied to suit conditions. It is advantageous, however, to have the temperature of the liquid at the bottom of the extraction towers somewhat higher than that at the top. More particularly, it is desirable to have a drop in temperature in the direction of solvent flow. The temperature drop through the tower may be as much as one hundred to two hundred Fahrenheit degrees if desired and can be regulated by adjusting the temperature of the incoming oil and solvent, as well as by suitably arranged heating and cooling units. It is also advantageous to operate at a somewhat elevated temperature, say 100–170° F. At the higher temperatures the viscosity of the liquids is considerably reduced which facilitates the flow through the system and favors more efficient extraction. It is also of advantage to have a fairly high temperature when using the procedure according to which part of the extract is precipitated in the separator 17 by cooling. Thus, by being able to adjust the dissolving power of the methylamine solvent by the modifying solvent, it is possible to have optimum conditions for extraction. With ordinary extraction solvents, the dissolving power of the solvent may only be adjusted by temperatures, but in so doing other factors are simultaneously affected, frequently in an undesirable way. It is often advantageous to mix the oil to be extracted with lighter, less viscous paraffinic type hydrocarbons, particularly the lower paraffinic petroleum fractions such as naphtha or kerosene which can subsequently be removed from the raffinate by evaporation at relatively low temperatures. This is particularly advantageous in treating very viscous oil or oils which on extraction yield fractions of very high viscosity. The lighter hydrocarbon reduces the viscosity of the heavy oil, thus facilitating its flow through the system and making it more easily accessible to the action of the solvent. The amount of light hydrocarbon added can be varied over a rather wide range, for example from 1 to 3 volumes of diluent to 10 volumes of oil. The actual amount used will naturally depend on the properties of the oil being treated, the desired reduction in viscosity and the composition of the solvent being used. The diluent may be added before the oil enters the extraction system or at a later stage. For example, if the initial oil is not very viscous and can be treated without dilution in the first tower but yields a very viscous raffinate in the second tower, the diluent may be added as the oil enters the second tower.

For extracting materials of low viscosity and low molecular weight such as gasolines, methylamine-water solutions are effective solvents. In some cases these solvents may be heavier, rather than lighter, than the mixture being extracted but the same methods of operation and the same principles apply. Methylamine-ammonia solvents are also particularly suited for extracting gasoline, kerosene, and light oils.

In the claims the term "mineral oil" is used to denote mixtures that are predominantly hydrocarbons, such as exist in petroleum or its fractions or in hydrocarbon mixtures obtained from the processing of carbonaceous materials, such as petroleum or its fractions.

We claim:

1. A continuous process of separating mineral oil into fractions which comprises flowing the oil in a first extraction zone countercurrently to a solvent comprised of a primary solvent and a modifying solvent containing extract from a second extraction zone, passing the raffinate from the said first zone through the second zone countercurrently to fresh solvent of relatively high dissolving capacity and containing a relatively large proportion of primary solvent, removing the raffinate thus formed from the system, treating the extract phase from the second zone to reduce the dissolving capacity of the solvent and to precipitate at least a part of the solute, and removing part of the precipitate from the system, returning the rest to the second zone, conducting the remainder of the extract phase to the first extraction zone, conducting the extract phase from the first zone to a third extraction zone and mixing it with an extract phase from a fourth extraction zone, combining any precipitate so resulting with the raffinate from the third zone to form an oil phase, conducting the said oil phase in part to the first zone and in part to the fourth zone, treating the oil phase in the fourth zone with a solvent of relatively low dissolving capacity containing a relatively lower proportion of primary solvent, and removing the raffinate thus formed from the system, conducting the extract phase from this zone to the third zone, removing the extract phase from the third zone, treating it to reduce the dissolving capacity and to precipitate the solute, removing part of the precipitate from the system and returning the rest to the third zone at a point near the withdrawal point of the extract phase from the third zone.

2. A continuous process for separating mineral oil into fractions which comprises flowing the oil in a first extraction zone countercurrently to a solvent comprising a primary solvent and a modifying solvent containing extract from a second extraction zone, passing the raffinate from the said first zone through the second zone countercurrently to fresh solvent of relatively high dissolving capacity, removing the raffinate thus formed from the system, conducting the extract phase from the second zone to the first extraction zone, combining the extract phase from the first zone with extract phase from a fourth extraction zone, flowing the combined extract phase into a third extraction zone, combining any precipitate and the raffinate from the third zone to form an oil phase, conducting said oil phase in part to the first zone, and in part to the fourth zone, treating the said oil phase in the fourth zone with solvent of relatively low dissolving capacity and removing the raffinate thus formed from the system, conducting the extract phase from this zone to the third zone, removing the extract phase from the third zone, treating it to reduce the dissolving capacity and to precipitate the solute, removing part of this precipitate from the system, and returning the rest to the third zone at a point near the withdrawal point of the extract phase from the third zone.

3. A continuous process for separating mineral oil into fractions which comprises flowing the oil in a first extraction zone countercurrently to a methylamine solvent containing extract from a second extraction zone, passing the raffinate from the said first zone through the second zone countercurrently to fresh methylamine solvent, removing the raffinate thus formed from the system, conducting the extract phase from the second zone to the first extraction zone, combining the extract phase from the first zone with extract phase from a fourth extraction zone, flowing the combined extract phase into a third extraction zone, mixing any precipitate formed from the combined extract phase with the raffinate from the third zone to form an oil phase, conducting said oil phase in part to the first zone, and in part to the fourth zone, treating the said oil phase in the fourth zone with a methylamine solvent of relatively low dissolving capacity and removing the raffinate thus formed from the system, conducting the extract phase from this zone to the third zone, removing the extract phase from the third zone, treating it to reduce the dissolving capacity and to precipitate the solute, removing part of this precipitate from the system, and returning the rest to the third zone at a point near the withdrawal point of the extract phase from the third zone.

4. A continuous process of separating mineral oil into fractions which comprises flowing the oil in a first extraction zone countercurrently to a methylamine solvent containing extract from a second extraction zone, passing the raffinate from said first zone through the second zone countercurrently to fresh methylamine solvent of relatively high dissolving capacity, removing the raffinate thus formed from the system, treating the extract phase from the second zone to reduce the dissolving capacity of the solvent and to precipitate at least part of the solute, and removing at least part of the precipitate from the system, conducting the remainder of the extract phase to the first extraction zone, conducting the extract phase formed in the first zone to a third extraction zone and mixing it with an extract phase from a fourth extraction zone, combining any precipitate so resulting with the raffinate from the third zone to form an oil phase, conducting the said oil phase in part to the first zone and in part to the fourth zone, treating the oil phase in the fourth zone with a methylamine solvent of relatively low dissolving capacity and removing the raffinate thus formed from the system, conducting the extract phase from this zone to the third zone, removing an extract phase from the third zone, treating it to reduce the dissolving capacity and removing at least part of the precipitate thus formed from the system.

5. A continuous process of separating mineral oil into fractions which comprises flowing the oil in a first extraction zone countercurrently to a methylamine solvent containing extract from a second extraction zone, passing the raffinate from the said first zone through the second zone countercurrently to fresh methylamine solvent of relatively high dissolving capacity, removing the raffinate thus formed from the system, treating the extract phase from the second zone to reduce the dissolving capacity of the solvent and to precipitate at least part of the solute, and removing part of the precipitate from the system, returning the rest to the second zone, conducting the remainder of the extract phase to the first extraction zone, conducting the extract phase from the first zone to a third extraction zone and mixing it with an extract phase from a fourth extraction zone, combining any precipitate so resulting with the raffinate from the third zone to form an oil phase, conducting the said oil phase in part to the first zone and in part to the fourth zone, treating the oil phase in the fourth zone with a methylamine solvent of relatively low dissolving capacity and removing the raffinate thus formed from the system, conducting the extract phase from the third zone, treating it to reduce the dissolving capacity and to precipitate the solute, removing part of the precipitate from the system and returning the rest to the third zone at a point near the withdrawal point of the extract phase.

6. A continuous process of separating mineral oil into fractions which comprises flowing the oil in a first extraction zone countercurrently to a solvent composed of methylamine and methanol and containing extract from a second extraction zone, passing the raffinate from the first zone through the second zone countercurrently to fresh solvent containing less methanol than the solvent in the first zone, removing the raffinate thus formed from the system, adding methanol to the extract phase from the second zone to precipitate at least part of the solute and removing at least part of the precipitate from the system, conducting the remainder of the extract phase to the first extraction zone, conducting the extract phase formed in the first zone to a third extraction zone and mixing it with an extract phase from a fourth extraction zone, combining any precipitate so resulting with the raffinate from the third zone to form an oil phase, conducting the said oil phase in part to the first zone and in part to the fourth zone, treating the oil phase in the fourth zone with a solvent containing a greater proportion of methanol than is contained in the solvent coming from the first zone, removing the raffinate thus formed from the system, conducting the extract phase from this zone to the third zone, removing an extract phase from the third zone, adding methanol to it to precipitate the solute, removing at least part of the precipitate thus formed from the system, and returning the rest to the third zone at a point near the withdrawal point of the extract phase from the third zone.

7. A continuous process of separating mineral oil into fractions which comprises flowing the oil in a first extraction zone countercurrently to a solvent comprised of a primary solvent and a modifying solvent containing extract from a second extraction zone, passing the raffinate from the said first zone into the second zone at an intermediate point and passing it countercurrently to fresh solvent of relatively high dissolving capacity and containing a relatively large proportion of primary solvent, removing the raffinate from the second extraction zone from the system, treating the extract phase from the second zone to reduce the dissolving capacity of the solvent and to precipitate at least a part of the solute, and removing part of the precipitate from the system, returning the rest to the second zone, conducting the remainder of the extract phase to the first zone, conducting the extract phase from the first zone to a third extraction zone, removing the extract phase from the third zone, treating it to reduce the dissolving capacity of the solvent and to precipitate the solute, removing part of the precipitate from the system and returning the rest to the third zone at a point near the withdrawal point of the extract phase from the third zone.

8. A continuous process of separating mineral oil into more than two fractions of different chemical and physical characteristics, which comprises flowing an oil phase and a solvent phase countercurrently through an extraction path, withdrawing a raffinate fraction and an extract fraction at points in the extraction path adjacent where the main solvent flow enters and leaves said path, respectively, removing solvent phase from a point in the extraction path intermediate the points aforesaid, flowing the removed solvent phase through a second extraction path, separating an oil phase from the solvent phase leaving said second extraction path and dividing said separated oil phase into two parts, countercurrently extracting the removed solvent phase passing through said second extraction path with one part of the oil phase so divided, withdrawing the other part of the oil phase as a third fraction, and returning to the first extraction path that part of the oil phase used to extract said removed solvent phase.

9. A continuous process of separating mineral oil into more than two fractions of different chemical and physical characteristics, which comprises flowing an oil phase and a solvent phase countercurrently through an extraction path, withdrawing a raffinate fraction and an extract fraction at points in the extraction path adjacent where the main solvent flow enters and leaves said path, respectively, removing solvent phase from a point intermediate the points in the said extraction path where the mineral oil enters and the raffinate fraction is withdrawn, flowing the removed solvent phase through a second extraction path, separating an oil phase from the solvent phase leaving said second extraction path, and dividing said separated oil phase into two parts, countercurrently extracting the removed solvent phase passing through said second extraction path with one part of the oil so divided, withdrawing the other part of the oil phase as a third fraction, and returning to the first extraction path that part of the oil phase used to extract said removed solvent phase.

10. A continuous process of separating mineral oil into more than two fractions of different chemical and physical characteristics, which comprises flowing an oil phase and a solvent phase countercurrently through an extraction path, withdrawing a raffinate fraction and an extract fraction at points in the extraction path adjacent where the main solvent flow enters and leaves said path, respectively, removing solvent phase from a point intermediate the points in the said extraction path where the mineral oil enters and the raffinate fraction is withdrawn, flowing the removed solvent phase through a second extraction path, separating an oil phase from the solvent phase leaving said second extraction path, and dividing said separated oil phase into two parts, countercurrently extracting the removed solvent phase passing through said second extraction path with one part of the oil so divided, withdrawing the other part of the oil phase as a third fraction, and returning to the first extraction path that part of the oil phase used to extract said removed solvent phase at a point near that where the solvent phase was withdrawn.

11. A continuous process of separating mineral oil into more than two fractions of different chemical and physical characteristics, which comprises flowing an oil phase and a solvent phase countercurrently through an extraction path, withdrawing a raffinate fraction and an extract fraction at points in the extraction path adjacent where the main solvent flow enters and leaves said path, respectively, removing solvent phase from a point in the extraction path intermediate the points aforesaid, flowing the removed solvent phase through a second extraction path, separating an oil phase from the solvent phase leaving said second extraction path, countercurrently extracting the removed solvent phase passing through said second extraction path with oil phase so separated, withdrawing at least a part of the more soluble components of the removed solvent phase as a third fraction, and returning to the first extraction path oil phase used to extract said removed solvent phase.

12. A process as described in claim 7 in which the primary solvent is methylamine and the modifying solvent is methanol.

13. A process as described in claim 7 in which the primary solvent is methylamine and the modifying solvent is ammonia.

14. A process as described in claim 9 in which the solvent comprises methylamine and methanol.

15. A process as described in claim 9 in which the solvent comprises methylamine and ammonia.

CHESTER E. ANDREWS.
MERRELL R. FENSKE.